Patented Nov. 3, 1942

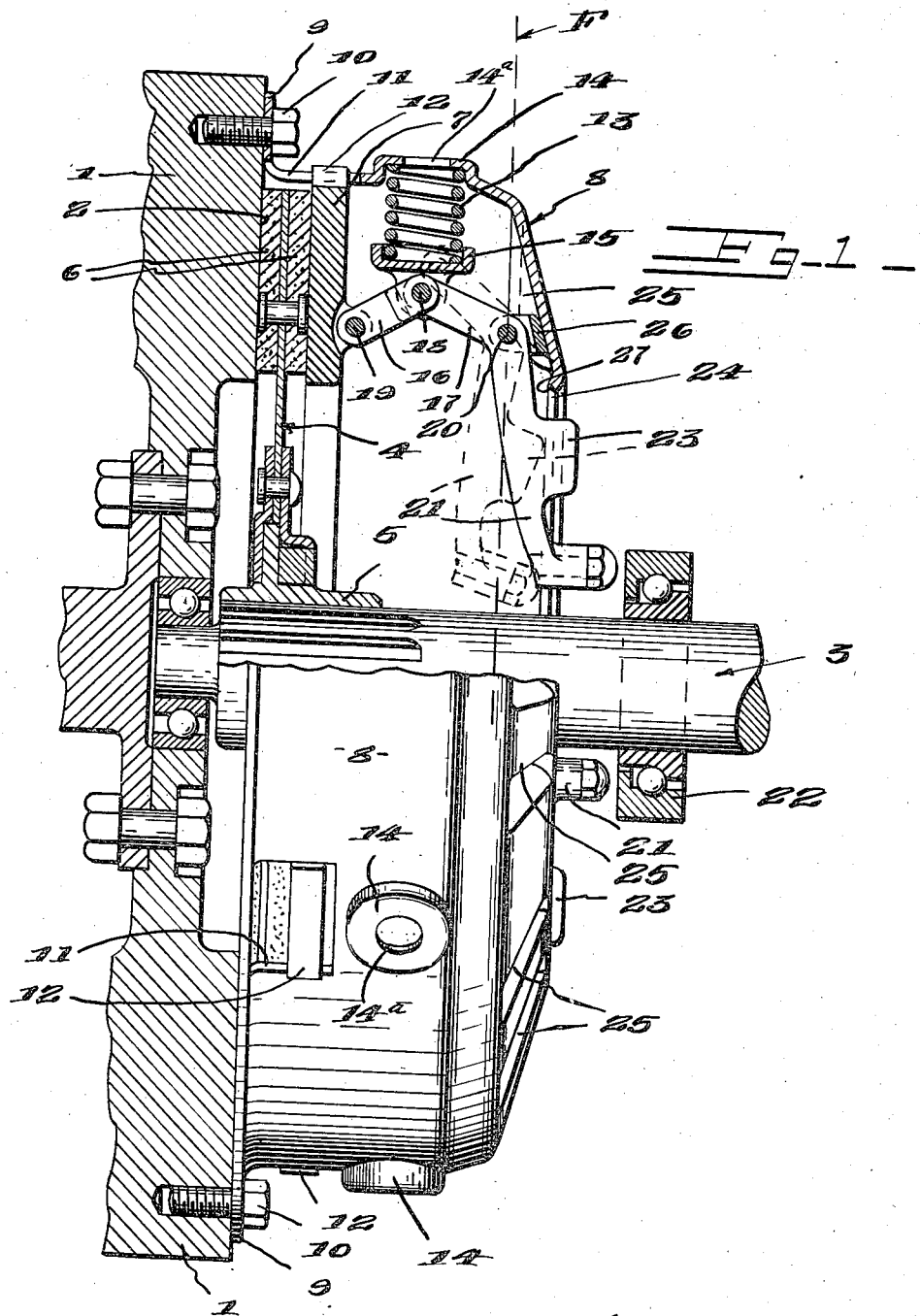

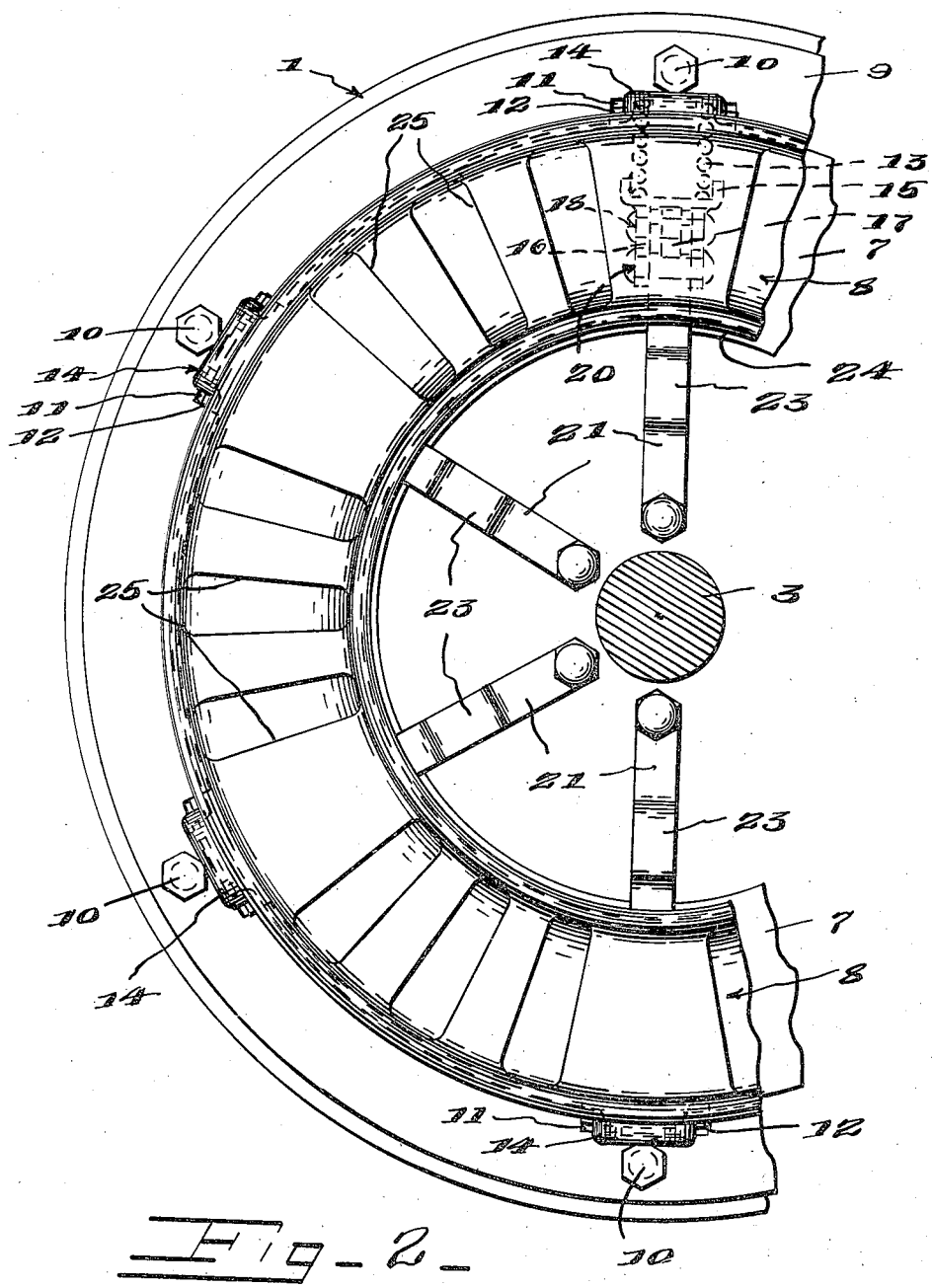

2,300,521

UNITED STATES PATENT OFFICE 2,300,521

FRICTION CLUTCH WITH RADIAL SPRINGS

Charles B. Spase, Nedrow, N. Y., assignor to W. C. Lipe, Inc., Syracuse, N. Y., a corporation of New York Application October 2, 1939, Serial No. 297,448

7 Claims. (Cl. 192—103)

This invention relates to friction clutches, such as are used in motor vehicles, and has for its object a clutch in which the clutch springs act radially instead of axially or in an axial direction.

It also has for its object a motion transmitting means for transferring the force of the radial springs in an axial direction to the shiftable element of the clutch, and throw-out levers coacting with said motion transmitting means to relieve the shiftable element of force of the springs to disengage the clutch upon operation of said levers.

It further has for its object an arrangement of radial springs and the motion transmitting means and the clutch levers, whereby the centrifugal weights of the springs and motion transmitting means, is opposed or neutralized by the centrifugal weight of the operating levers; and also an arrangement whereby the centrifugal weights of the springs and motion transmitting means act in conjunction with (in contradistinction to in opposition to) the centrifugal weight of the levers, when the clutch is disengaged or being disengaged, so that pressure on the clutch pedal or other operating means to disengage the clutch decreases, or does not increase as the clutch is being disengaged.

It also has for its object a motion transmitting means through which the force of the clutch spring means is applied to the pressure member or pressure ring, remains constant regardless of wear at the friction faces of the clutch, and consequent elongation of the clutch springs so that there is no loss in pressure as a result of wear or lengthening of the springs. The specific motion transmitting means here shown is a toggle for each spring arranged to have an automatic follow-up or compensating action from folded toward straight line position, as the clutch or the facings thereof wear.

It also has for its object a clutch in which the series of springs which thrust the pressure plate, pressure member or pressure ring into clutch engaging position, are out of contact with the pressure ring, and hence out of heat-conducting relation thereto, so that deterioration or weakening of the springs, due to heat generated in the pressure ring, is eliminated. It will be understood that in clutches in which the springs act directly on the pressure ring, the springs take up the heat from the pressure ring and deteriorate rapidly, causing faulty clutch engagement and a slipping clutch. It is also well known that heat, and oftentimes excessive heat is generated, in the pressure ring, due to slippage of the clutch, particularly during re-engagement of the clutch.

The invention consists in the novel features and in the combinations and constructions hereinafter set forth and claimed.

In describing this invention, reference is had to the accompanying drawings in which like characters designate corresponding parts in all the views.

Figure 1 is a side elevation, partly in section, of a clutch embodying this invention.

Figure 2 is a fragmentary elevation looking to the left in Figure 1, the throw-out collar being omitted.

This clutch comprises, generally, driving and driven elements, one of which includes an axially shiftable member operable to engage and disengage the clutch, a suitable housing, radial springs, and motion transmitting means operated thereby to transmit the radial action of the springs axially to the shiftable member, together with throw-out levers operated by the usual throw-out collar acting in conjunction with said motion transmitting means to disengage the clutch against the action of the radial spring. As here shown, the driving element of the clutch embodies an axially shiftable member or pressure ring.

1 designates the driving element, which may be the fly wheel of the engine of a motor vehicle, the fly wheel being here shown as having a flat clutch face 2 on the rear side thereof in contradistinction to a flat face at the bottom of the recess in the fly wheel.

3 designates the clutch shaft; 4 the driven element, here shown as a disk having a hub 5 slidably splined on the shaft 3 and provided with friction facings 6 on opposite sides of its margins. 7 designates the shiftable element or pressure ring. The disk 4 extends between the fly wheel 1 and the pressure ring 7.

8 designates a housing usually formed of sheet metal, this having an annular flange 9 which is secured, as by screws 10, to the fly wheel 1. It is formed with suitable slots 11 with which teeth 12 on the pressure ring 7 interlock.

13 designates radially extending clutch springs shown in this embodiment of the invention as located outward radially relative to the motion transmitting means or toggles to be described. The springs thrust at their outer ends against seats 14 formed in the peripheral wall of the housing and thrust at their inner ends against seats 15 carried by motion transmitting connections which transfer the radial action of the springs axially to the pressure ring 7.

The motion transmitting means for each spring is here shown as consisting of toggle links 16, 17 pivoted together at like ends at 18 and at their outer ends at 19 and 20 respectively to the pressure ring 7 and the housing 8. The spring seat 15 is pivoted to the toggle at the joint 18.

21 designates the clutch levers, there being one lever for each toggle 16, 17, and each lever being rigid with and preferably integral with the link 17 of each toggle. The levers 21 extend radially inward toward the shaft 3 and coact at their inner ends with the throw-out collar 22 slidable axially of the shaft 3 by any suitable throw-out mechanism. The throw-out mechanism is usually operated by a clutch pedal.

The toggle links 16, 17 are usually arranged in folded position outwardly and the springs tend to force them inward toward a straight line passing through the pivots 19, 20. During the rotation of the clutch, the centrifugal force or weight of the springs 13, seats 15, toggle links 16, 17 will tend to neutralize or offset the action of the springs. In order to compensate for this effect, the levers 21 are so arranged that their centrifugal weight or the centrifugal force thereon acts, when the clutch is engaged, in opposition to the centrifugal force acting on the springs 13, toggle links 16, 17; and the levers are preferably provided with weights 23 to counterbalance the centrifugal weight of the springs and toggles. The levers 21 are so arranged that when the clutch is being disengaged, the line of gravitation of the centrifugal weight of the levers passes into or through the fulcrum plane, indicated by the line F, of the levers, so that the centrifugal weights of the spring, toggles and levers act together on the same side of the pivots of the levers. Hence, the force required to be applied to the clutch pedal or other operating part to disengage the clutch decreases, or does not increase, as the clutch is being disengaged against the springs.

A suitable stop is provided for preventing the toggle links 16, 17 from passing into their dead center line, and as here shown, the back wall of the housing is provided with a stop 27 at the edge of the opening 24, to limit the rearward movement of the levers 21 before the toggle straightens into its dead center line.

As the clutch facings wear, the toggles automatically move or follow up to a position near a straight line and the springs elongate, but the pressure applied to the pressure ring remains constant or does not decrease, because of the spring elongation.

The back wall of the housing is formed with a concentric opening 24 around the shaft 3 through which the levers 21 extend, and in order to stiffen the back wall of the housing, it is provided with suitable radial corrugations 25. The pivots 20 of the toggle link 17 and lever 21 are mounted in suitable bearings 26 welded or otherwise secured to the back wall of the housing 8.

As the springs do not thrust directly against the pressure ring, they do not absorb heat therefrom, and hence are not subject to deterioration, because of the heat. For facilitating the cooling of the springs and clutch parts, the housing is ventilated so that the heat absorbed by the toggles from the pressure ring is dissipated and is not conducted to the springs. As here shown, the housings are formed with perforations 14a formed in the spring seats 14.

In operation, the radial springs thrust inwardly against the joints of the toggle links 16, 17, and hence thrust the pressure ring 7 against the disk 4 and press the disk against the clutch face 2 of the fly wheel 1. During the rotation of the clutch, the centrifugal weights of the springs 13, seats 15 and links 16, 17 offset, or are neutralized by the centrifugal weight of the levers 21. To disengage the clutch, the throw-out collar is shifted inwardly by any suitable throw-out mechanism, thus moving the levers 21 inwardly about the pivots 20, causing the toggle links 16, 17 to move outwardly into a greater folding angle, thus withdrawing the pressure ring 7 and permitting the clutch to disengage. Also, the clutch levers are shifted indirectly across the fulcrum plane F into the dotted line position (Figure 1) so that the centrifugal weights act on the same side of the fulcrum plane.

What I claim is:

1. In a friction clutch, driving and driven elements, one of which includes an axially shiftable member operable to engage and disengage the clutch, springs for actuating said member to engage the clutch, arranged radially relatively to the axis of the clutch, means for transferring the radial action of the springs to the shiftable member, and throw-out means operable to disengage the clutch against the action of the springs, including radial and inwardly extending levers connected to the transfer means to operate the same against the action of the springs, the springs and the levers being so arranged that the centrifugal force on the weights of the springs and transfer means oppose that of the levers.

2. In a friction clutch, driving and driven elements, one of which includes an axially shiftable member operable to engage and disengage the clutch, springs for actuating said member to engage the clutch, arranged radially relatively to the axis of the clutch, means for transferring the radial action of the springs to the shiftable member, and throw-out means operable to disengage the clutch against the action of the springs, said transfer means including toggles extending in a general direction parallel to the axis of the clutch, said toggles being arranged to be partially folded when the clutch is engaged, the springs thrusting against the joints of the toggles, holding the clutch engaged, and tending to straighten the toggles, and throwout means including radially extending levers coacting with like ends of the toggles to actuate the same and effect folding of the toggles against the action of the springs, the levers and the toggles being so arranged that the centrifugal force on the weights of the toggles and springs are opposed by the centrifugal force on the weight of the levers.

3. In a friction clutch, driving and driven elements, one of which includes an axially shiftable member operable to engage and disengage the clutch, means for actuating the shiftable member, a casing enclosing the shiftable member and the actuating means, said actuating means including toggles, each including links pivoted together and, respectively, to the shiftable member and to the casing, springs thrusting against the joints of the toggles tending to straighten the toggles, throw-out lever pivoted to the casing coaxially with like links of the toggles and rigid therewith, the levers extending radially inward, and a throw-out collar coacting with the inner ends of said levers, the springs being arranged radially outward relative to the toggles, and the levers being so arranged that their centrifugal weight opposes the centrifugal weight of the toggles and springs.

4. In a friction clutch, driving and driven elements, one of which includes an axially shiftable member operable to engage and disengage the clutch, means for actuating the shiftable member, a casing enclosing the shiftable member and the actuating means, said actuating means including radially arranged springs thrusting at like ends against the casing, toggles, each including links pivoted together and, respectively, to the shiftable member and to the housing, the springs thrusting against the joints of the toggles, and tending to straighten the toggles, throw-out levers pivoted to the housing coaxially with like toggle links and rigid therewith, and a throw-out collar coacting with the inner ends of said levers, the levers and the links of the toggles rigid therewith being so arranged relatively to their axis that the centrifugal weight of the toggles and the springs is opposed by the centrifugal weight of the levers.

5. In a friction clutch, driving and driven elements, one of which includes an axially shiftable member operable to engage and disengage the clutch, springs for actuating said member to engage the clutch arranged radially to the axis of the clutch, means for transferring the radial action of the springs to the shiftable member, throw-out means extending inwardly and coacting with said transfer means, the levers having their greater portions normally extending on one side of the fulcrum plane of the levers, in order that the centrifugal weights tend to hold the clutch engaged, and being shiftable to disengage the clutch through said fulcrum plane to disengage the clutch against the action of the springs, whereby the centrifugal weights of the levers act in opposition to the forces of the springs while the clutch is being disengaged and thereby neutralize the increasing force of the springs due to the compression thereof, as the clutch is being disengaged, and a throw-out collar coacting with the inner ends of the levers.

6. In a friction clutch, driving and driven elements, one of which includes an axially shiftable member operable to engage and disengage the clutch, means for actuating the shiftable member, a casing enclosing the shiftable member and the actuating means, said actuating means including toggles, each including links pivoted together and, respectively, to the shiftable member and to the housing, springs thrusting against the joints of the toggles tending to straighten the toggles, throw-out levers pivoted to the housing coaxially with like links of the toggles and rigid therewith, the levers extending radially inward, and a throw-out collar coacting with the inner ends of said levers, the levers being normally arranged on one side of the fulcrum plane of the levers, this being the side opposite to that on which the toggle links are located and being movable through said plane when the clutch is being disengaged.

7. In a friction clutch, driving and driven elements, one of which includes an axially shiftable member operable to engage and disengage the clutch, means for actuating the shiftable member, a casing enclosing the shiftable member and the actuating means, said actuating means including radially arranged springs thrusting at like ends against the casing, toggles, each including links pivoted together and, respectively, to the shiftable member and to the housing, the springs thrusting against the joints of the toggles, and tending to straighten the toggles, throw-out levers pivoted to the housing coaxially with like toggle links and rigid therewith, and a throw-out collar coacting with the inner ends of said levers, the levers and the links of the toggles rigid therewith being so arranged relatively to their axis that the centrifugal weight of the toggles and the springs is opposed by the centrifugal weight of the levers, the levers being shiftable during disengaging of the clutch into a position in which the centrifugal weight of the levers act in conjunction with the centrifugal weight of the toggles and springs.

CHARLES B. SPASE.